July 5, 1927.
O. SIVERTZEN
1,634,855
PRINTING APPARATUS
Original Filed Jan. 19, 1924
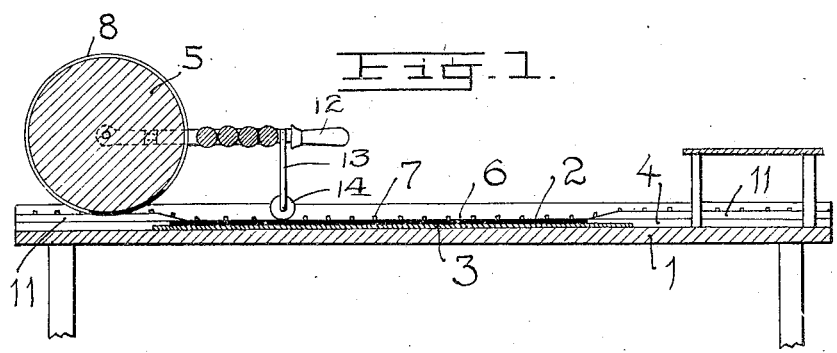
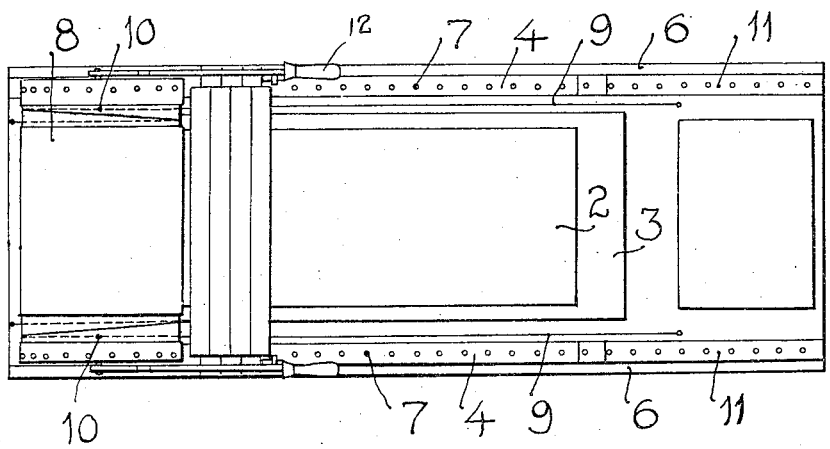
Inventor
Oscar Sivertzen Patented July 5, 1927.

1,634,855

UNITED STATES PATENT OFFICE.

OSCAR SIVERTZEN, OF TRONDHJEM, NORWAY.

PRINTING APPARATUS.

Application filed January 19, 1924, Serial No. 687,386, and in Norway February 3, 1923. Renewed April 30, 1927.

This invention relates to printing apparatus, and it has for its object to provide apparatus for printing on glass and similar fragile materials.

Printing on glass with machines is difficult because ordinary glass is not flat but is more or less curved so that the usual form of printing roller carried in bearings invariably causes breakage of the glass.

Printing apparatus according to the present invention comprises in combination a table to carry the article to be printed, a printing roller and guiding means on the table for the roller, for example, a pair of rails on which the roller rolls. Preferably, there is provided a rack and pinion connecting the roller and the table.

There may also be provided means adjustable in position to raise the roller from the surface to be printed at the end of the printing operation.

The roller is of an elastic material, such as rubber or wood pulp and it is a feature of the invention that it is not mounted in bearings so that it can move in a plane at right angles to the surface to be printed.

One form of apparatus according to the present invention will now be described with reference to the accompanying drawings, wherein:—

Fig. 1 is a vertical section, and
Fig. 2 is a plan view.

On a table 1 is placed the sheet of glass 2, to which the printing is to be applied, the glass resting on an elastic support 3 such as a sheet of rubber. On each side of the table is a rail 4 on which the printing roller 5 moves over the glass. The rails 4 are covered with an elastic material such as rubber and are provided with raised edges 6 to prevent axial movement of the roller. The rails are furthermore provided with pegs or projections 7 which engage corresponding holes or depressions in the roller, thus constituting a rack and pinion arrangement, whereby the roller is prevented from slipping. The matrix 8 which may be of linoleum or other suitable material is placed round the roller.

To secure further the position of the roller a flexible member, such as a wire or chain 9, may be arranged on the inner side of the rails, said wires or chains being passed round the roller and fixed thereto at points 10. The other ends of the wires or chains are fixed to the table. At each end of the rails 4 is arranged an extension 11 which is adjustable in position and which slopes down to the level of the rail. After passing over the glass the roller moves up on to said extensions, whereby it is cleared from the edge of the glass.

The necessary pressure is obtained by the weight of the roller and the weight varies with the shape and strength et cetera of the glass.

The roller is provided with inking rollers which may be arranged as indicated in the drawings. Roller 5 is also provided with a handle 12 having depending support 13 carrying a member 14 resting on the rails 4 between the pegs and the part 6.

Having now particularly described and ascertained the nature of my said invention and in what manner the same is to be performed, I declare that what I claim is:—

In combination a table, an elastic support thereon adapted to receive a plate of glass, a stepped rail at each longitudinal side of the table and having a raised portion extending above the surface of the glass plate, and having a roller supporting surface substantially flush with the surface of the glass plate, pegs arranged at spaced apart intervals in the rails at the glass plate surface level, a roller supported upon the rails and held between the rises of the raised portion thereof, depressions in the periphery of the roller corresponding to said pegs, a handle pivoted axially of said roller and having a depending support resting on the rails between the pegs and the raised portion of the rails.

In testimony that I claim the foregoing as my invention, I have signed my name.

OSC. SIVERTZEN.